US012325585B1

(12) United States Patent
Sansone

(10) Patent No.: US 12,325,585 B1
(45) Date of Patent: Jun. 10, 2025

(54) SANITARY PRODUCT DISPOSAL CONTAINER

(71) Applicant: Kelly Marie Sansone, Ocala, FL (US)

(72) Inventor: Kelly Marie Sansone, Ocala, FL (US)

( * ) Notice: Subject to any disclaimer, the term of this patent is extended or adjusted under 35 U.S.C. 154(b) by 0 days.

(21) Appl. No.: 18/596,162

(22) Filed: Mar. 5, 2024

Related U.S. Application Data

(63) Continuation of application No. 18/108,706, filed on Feb. 13, 2023, now Pat. No. 11,926,473, which is a continuation of application No. 17/573,902, filed on Jan. 12, 2022, now Pat. No. 11,577,911, which is a continuation of application No. 16/282,177, filed on Feb. 21, 2019, now Pat. No. 11,230,434, which is a continuation-in-part of application No. 15/217,994, filed on Jul. 23, 2016, now abandoned.

(60) Provisional application No. 62/196,764, filed on Jul. 24, 2015.

(51) Int. Cl.
*B65F 1/16* (2006.01)
*B65F 1/14* (2006.01)

(52) U.S. Cl.
CPC ............ *B65F 1/1638* (2013.01); *B65F 1/141* (2013.01); *B65F 1/1646* (2013.01); *B65F 2210/168* (2013.01); *B65F 2240/164* (2013.01)

(58) Field of Classification Search
CPC .. B65D 1/1638; B65D 1/1412; B65D 1/1646; B65D 2210/168; B65D 2240/164
USPC ......................................... 220/476, 263, 826
See application file for complete search history.

(56) References Cited

U.S. PATENT DOCUMENTS

| | | | |
|---|---|---|---|
| 1,874,833 A | 8/1932 | Taylor | |
| D438,964 S * | 3/2001 | Gaba | D24/131 |
| 2005/0033259 A1* | 2/2005 | Stravitz | A61B 50/36 604/403 |
| 2005/0103662 A1* | 5/2005 | Iske | A61B 50/10 206/363 |
| 2009/0071956 A1 | 3/2009 | Cheung | |
| 2012/0269320 A1* | 10/2012 | Karlovasitis | B65F 1/1426 378/57 |
| 2013/0122158 A1 | 5/2013 | Hessel et al. | |

(Continued)

FOREIGN PATENT DOCUMENTS

| | | | |
|---|---|---|---|
| WO | WO-2009117505 A1 * | 9/2009 | A61B 50/3001 |
| WO | WO-2014196874 A1 * | 12/2014 | B65B 9/2056 |

*Primary Examiner* — J. Gregory Pickett
*Assistant Examiner* — Niki M Eloshway
(74) *Attorney, Agent, or Firm* — John Rizvi; John Rizvi, P.A.—The Patent Professor®

(57) ABSTRACT

A sanitary product disposal container includes a container housing having a movable housing top cover, a movable housing bottom cover, and a sensor. A cover actuating mechanism may operably engage the housing top cover to actuate the housing top cover between open and closed positions. The sensor may operably interface with the cover actuating mechanism to facilitate deployment of the housing top cover between the open and closed positions responsive to sensing the presence of a person in proximity to the container housing. Accordingly, a used feminine hygiene product may be placed in the interior space of the container housing in the open position of the housing top cover without having to touch the container housing in order to open the housing top cover. The housing bottom cover may be selectively opened to facilitate removal of the used feminine hygiene products from the interior space.

16 Claims, 6 Drawing Sheets

(56) References Cited

U.S. PATENT DOCUMENTS

| | | | | |
|---|---|---|---|---|
| 2013/0146501 | A1* | 6/2013 | Zusmanis | B65F 1/1638 221/102 |
| 2013/0298506 | A1* | 11/2013 | Lucas | B65F 1/1426 53/574 |
| 2014/0305851 | A1* | 10/2014 | Hubbell | B65F 1/1473 209/552 |
| 2018/0110893 | A1* | 4/2018 | Chang | A61L 9/20 |

* cited by examiner

SANITARY PRODUCT DISPOSAL CONTAINER

CROSS-REFERENCE TO RELATED APPLICATIONS

This application is a Continuation of U.S. Utility patent application Ser. No. 18/108,706, filed on Feb. 13, 2023, which is a Continuation of U.S. Utility patent application Ser. No. 17/573,902, filed on Jan. 12, 2022, which is a Continuation of U.S. Utility patent application Ser. No. 16/282,177, filed on Feb. 21, 2019, which is a Continuation-In-Part of U.S. Utility patent application Ser. No. 15/217,994, filed on Jul. 23, 2016, which claims the benefit of U.S. Provisional Patent Application No. 62/196,764, filed on Jul. 24, 2015, all of which are incorporated by reference herein in their entirety.

FIELD OF THE INVENTION

The present invention relates generally to feminine sanitary products, and more particularly, to a sanitary product disposal container which is suitable to receive and enclose used sanitary products prior to their ultimate disposal.

BACKGROUND OF THE INVENTION

Disposable feminine hygiene products such as napkins and tampons are widely used by millions of female users in their everyday life. While the products as such continue to be improved and new variations of these products continue to be developed, disposal of these products has not been sufficiently addressed and continues to be cumbersome and non-hygienic. For example, consumers of these products may be required to dispose of the used products in a conventional waste receptacle, which may be typically open and receive paper towels and other trash. Accordingly, placing used feminine hygiene products in a conventional open waste receptacle may result in the spread of bacteria as well as emanation of objectional odors from the waste receptacle to the surrounding areas.

In some instances, receptacles specifically designed for discarding feminine sanitary products may be found installed in washrooms, typically inside each restroom cubicle in order for users to make use of them privately. Many of these receptacles are wall-mounted and include a container having a self-closing hinged cover which can be manually opened by the user for the purpose of disposing of a sanitary waste item into the container.

A problem with conventional feminine sanitary product disposal receptacles is that the cover becomes easily soiled when the user is depositing sanitary waste products into the container as the cover must be touched by the user. In consequence, germs and infectious organisms can easily be transferred to the next user of the disposal which can result in the spread of germs, increased risk of cross-contamination, and transmission of potential illness or disease. In addition, users have the feeling they are exposed to harmful agents by having to manually touch and operate the cover, and thus may easily feel uncomfortable when using conventional feminine sanitary product disposal receptacles.

Accordingly, there is an established need for a sanitary product disposal container which is suitable to receive and enclose used sanitary products prior to their ultimate disposal, and solves at least one of the aforementioned problems. For example, a feminine sanitary product disposal receptacle is desired where the user feels there is no risk of making contact with bacteria and other harmful agents when disposing sanitary waste items into the container.

SUMMARY OF THE INVENTION

The present invention is directed to a sanitary product disposal container which is suitable to receive and enclose used sanitary products prior to their ultimate disposal. The sanitary product disposal container may include a container housing having an interior space. A housing top cover may be provided on the container housing. The housing top cover may be deployable between open and closed positions on the container housing. A cover actuating mechanism may be provided in the interior space. The cover actuating mechanism is carried by the housing top cover and configured to actuate the housing top cover between the open and closed positions. At least one sensor may be provided on the housing top cover. The sensor may operably interface with the cover actuating mechanism to facilitate deployment of the housing top cover between the open and closed positions responsive to sensing the presence of a person in proximity to the container housing. Accordingly, a used feminine hygiene product may be placed in the interior space of the container housing in the open position of the housing top cover. The used feminine hygiene product may be enclosed in the container housing upon movement of the housing top cover to the closed position to prevent the spread of bacteria and/or emanation of odors from the interior space of the container housing. A housing bottom cover may be provided on the container housing. The housing bottom cover may be selectively deployable between open and closed positions on the container housing. In some embodiments, the housing bottom cover may be manually deployable between the open and closed positions. The housing bottom cover may be selectively opened to facilitate removal of the used feminine hygiene products from the interior space of the container housing.

The sanitary product disposal container of the present invention enables a user to open the container for the disposal of waste items thereinto without having to touch the container, thereby increasing hygiene, minimizing cross-contamination and creating a sanitary environment which helps prevent the spread of illness and generally keep the public healthier. Furthermore, by having the cover actuating mechanism carried by the housing top cover and movable with the housing top cover, the interior space of the container housing can be maximized and ease-of-use of the container is increased.

Introducing an illustrative embodiment of the invention, the present invention may include a sanitary product disposal container which is suitable to receive and enclose used sanitary products prior to their ultimate disposal, comprising:

- a container housing having an interior space;
- a housing top cover on the container housing, the housing top cover deployable between open and closed positions on the container housing;
- a cover actuating mechanism carried by the housing top cover and configured to actuate the housing top cover between the open and closed positions;
- at least one sensor operably interfacing with the cover actuating mechanism to facilitate deployment of the housing top cover between the open and closed positions responsive to sensing the presence of a person in proximity to the container housing; and a housing bottom cover on the container housing, the housing bottom cover selectively deployable between open and closed positions on the container housing.

In a second aspect, the housing top cover can be pivotably attached to the container housing, allowing the housing top cover to be opened and closed without separating from the container housing and thus further contributing to maintaining hygienic conditions of the container housing and housing top cover.

In another aspect, the housing top cover can be pivotably attached to the top of a rear panel of the container housing. The housing top cover can thus pivot rearward and upward (and thus away from a user who is standing in front of the sanitary product disposal container) when being switched from the closed position to the open position, increasing convenience of use of the device.

In another aspect, the housing top cover may be non-planar and may define an internal space oriented towards the interior space of the container housing. The internal space of the housing top cover houses the cover actuating mechanism. Such arrangement facilitates the housing top cover carrying the cover actuating mechanism such that the cover actuating mechanism is partially or totally concealed from the sight of a user standing in front of the sanitary product disposal container.

In another aspect, the housing top cover can include a convex top cover portion configured to close a top side of the housing container when the housing top cover is arranged in the closed position. The internal space of the housing top cover can be defined on an inner side of the convex top cover portion.

In another aspect, the convex top cover portion may be pivotably attached to the container housing.

In another aspect, the housing top cover can further include a flat front cover portion extending from a front of the convex top cover portion and configured to close a front side of the housing container when the housing top cover is arranged in the closed position.

In another aspect, the convex top cover portion and the flat front cover portion of the housing top cover may be deployable between the open and closed positions of the housing top cover jointly as a single unit.

In another aspect, the flat front cover portion and convex top cover portion may be pivotably attached to one another. The housing top cover can further adopt a partially-opened position in which the convex top cover portion is closed and the flat front cover portion is pivoted open relative to the convex top cover portion and the container housing, and provides access to the interior space of the container housing.

In another aspect, the at least one sensor can be provided in the housing top cover.

In another aspect, the at least one sensor can include one or more of a heat sensor, a motion sensor, a capacitive sensor and a proximity sensor configured to detect the presence of a person in the immediate surroundings of the sanitary product disposal container.

In another aspect, the container housing can include at least one housing mount slot configured to facilitate extending a fastener therethrough for the mounting of the sanitary product disposal container on a wall or other support structure.

In another aspect, the housing bottom cover can be pivotably attached to the container housing, allowing the housing bottom cover to be opened and closed without separating from the container housing and thus further contributing to maintaining hygienic conditions of the container housing and housing bottom cover.

In another aspect, the housing bottom cover may be pivotably attached to a bottom of a rear panel of the container housing. The housing bottom cover can thus pivot rearward and downward (and thus away from a subject who is standing in front of the sanitary product disposal container) when being switched from the closed position to the open position, facilitating the removal of waste items from the interior space of the container housing.

In another aspect, the housing bottom cover can be pivotable downward by gravity in order to switch from the closed position to the open position of the housing bottom cover.

In another aspect, the housing bottom cover may include a bottom cover portion and a front cover portion extending from the bottom cover portion. The bottom cover portion and front cover portion may be configured to close a bottom side and a front side, respectively, of the housing container when the housing bottom cover is arranged in the closed position.

In another aspect, the front cover portion of the housing bottom cover may be perpendicular to the bottom cover portion of the housing bottom cover.

The sanitary product disposal container of claim 16, wherein the bottom cover portion is pivotably attached to the container housing.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a sanitary product disposal container which is suitable to receive and enclose used sanitary products prior to their ultimate disposal.

Figure 1:
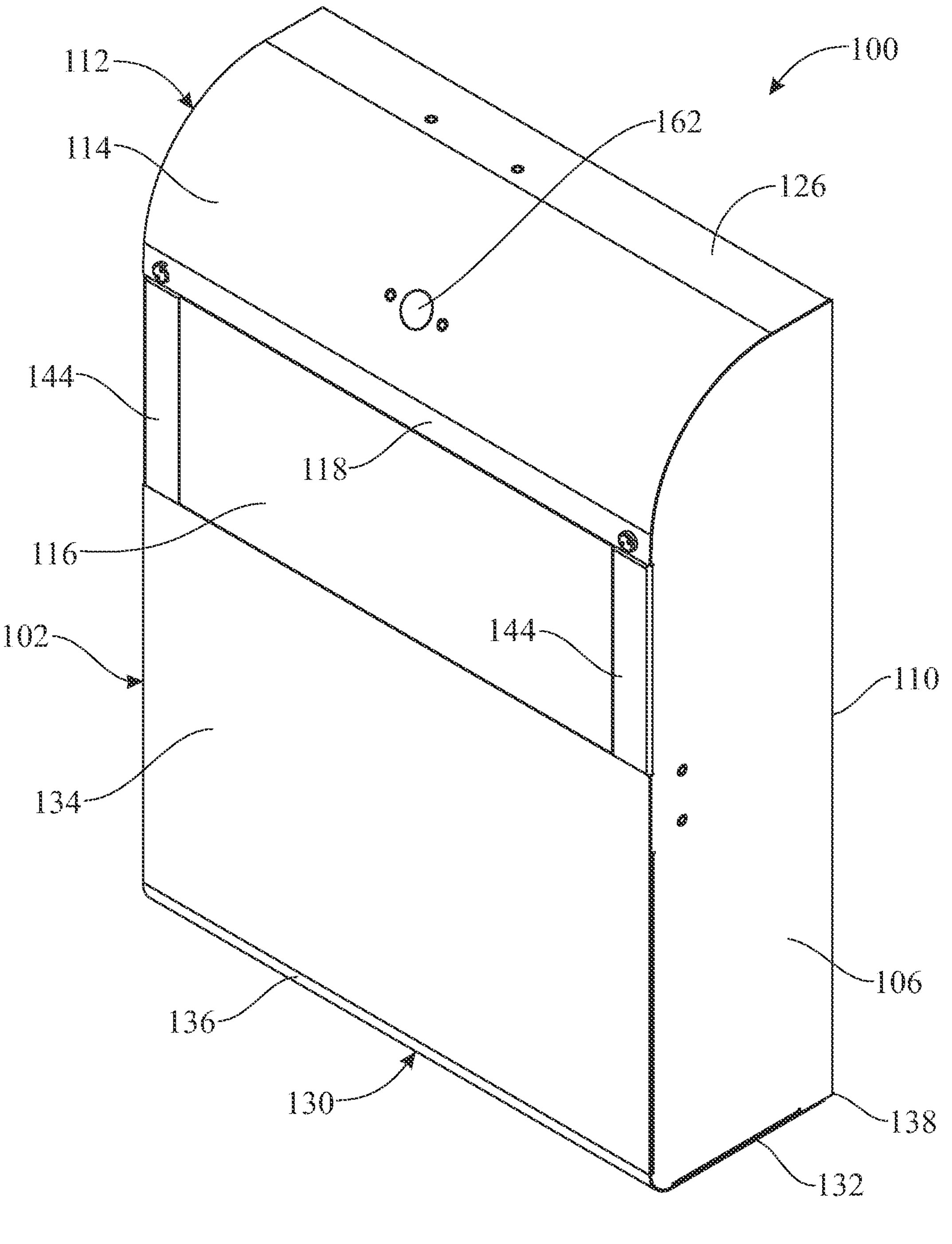
FIG. 1 presents a top front isometric view of a sanitary product disposal container in accordance with an illustrative embodiment of the present invention, with the housing top cover and the housing bottom cover shown in a closed position.
Figure 2:
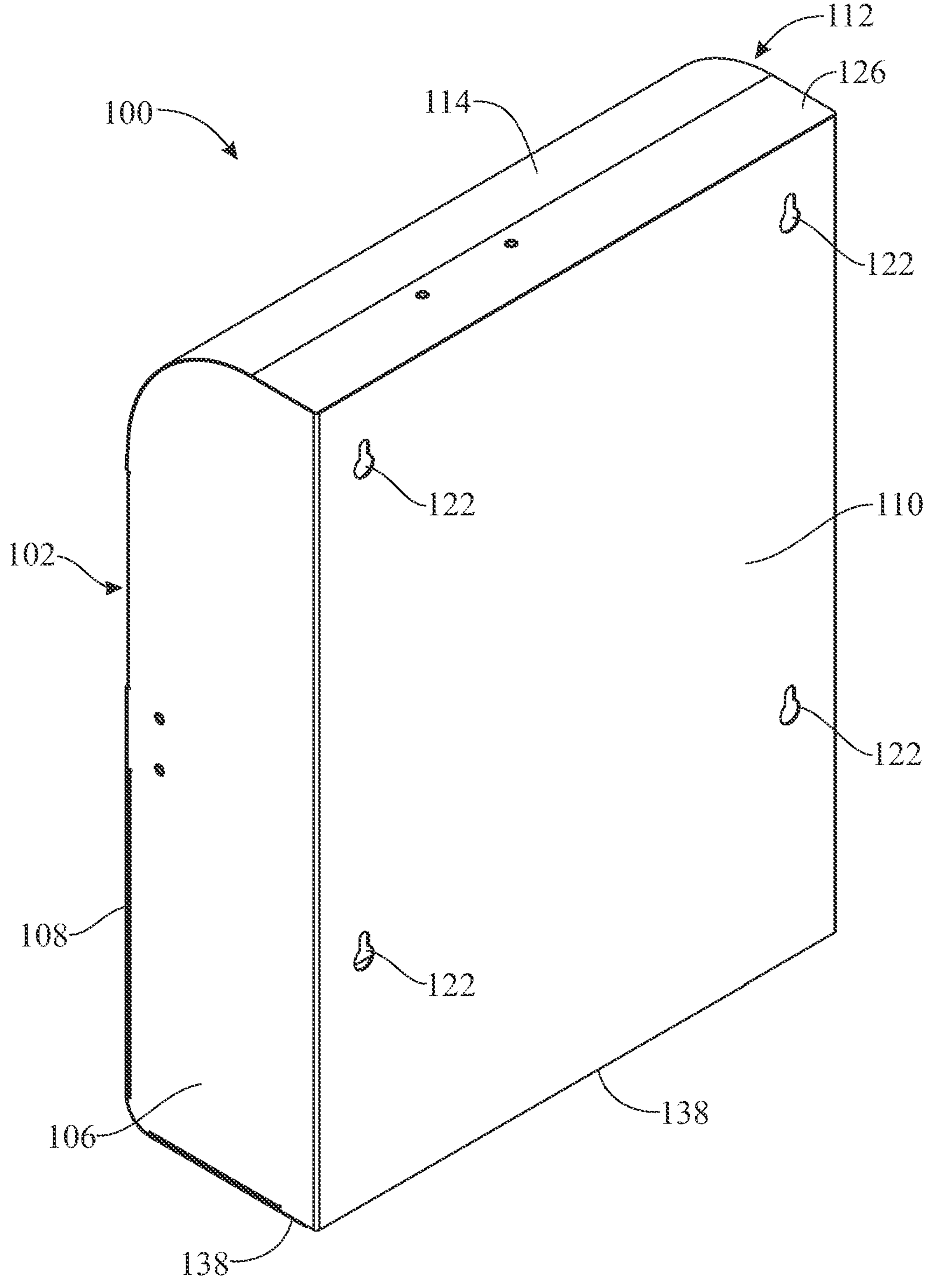
FIG. 2 presents a top rear isometric view of the sanitary product disposal container of FIG. 1, with the housing top cover and the housing bottom cover shown in a closed position.
Figure 3:
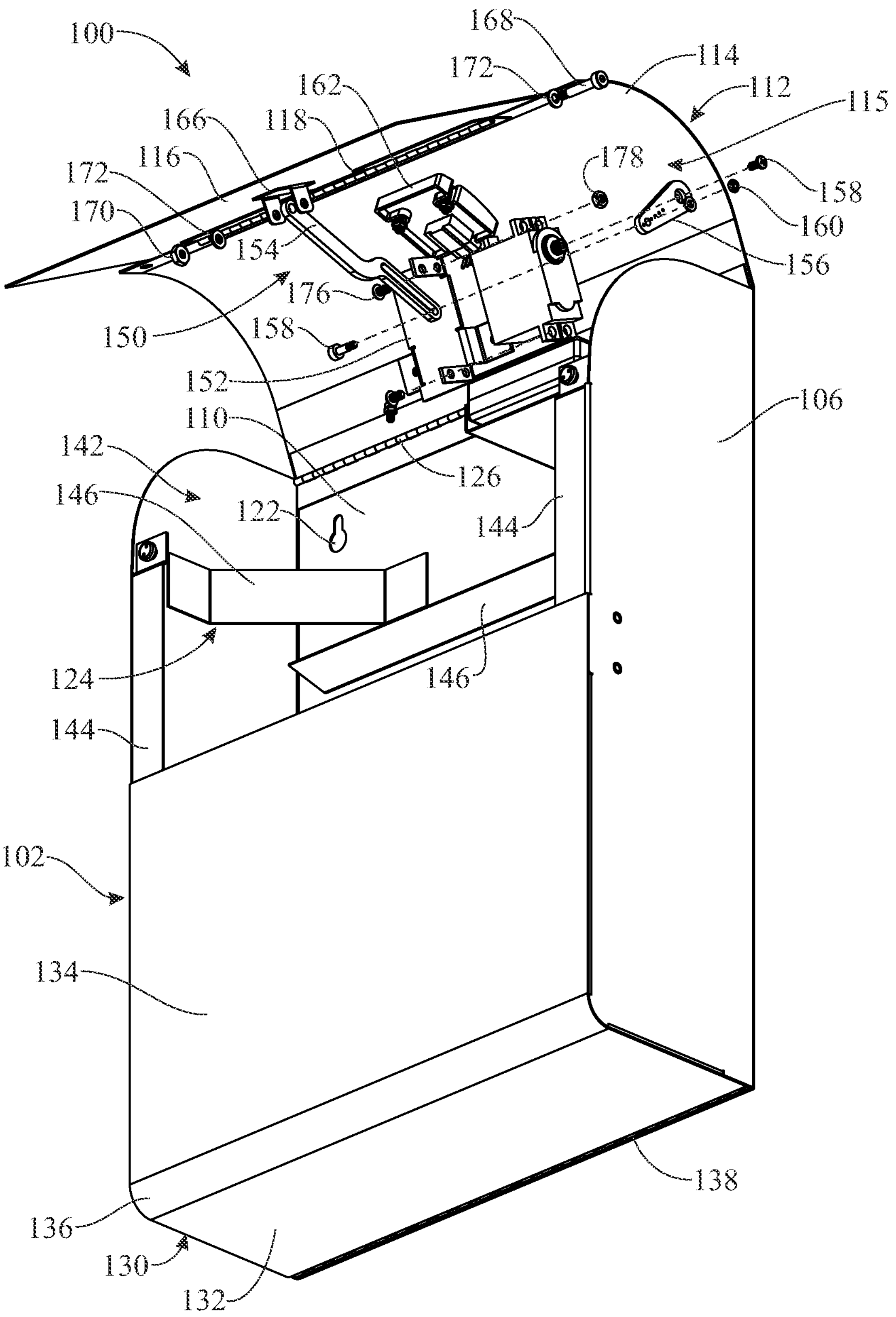
FIG. 3 presents a bottom front isometric view of the sanitary product disposal container of FIG. 1, with the housing top cover in an open position and the housing bottom cover in the closed position.

Referring to the drawings, and initially to FIG. 1, an illustrative embodiment of a sanitary product disposal container 100 is illustrated in accordance with an exemplary embodiment of the present invention. The sanitary product disposal container 100 may include a container housing 102 which can be made of plastic, metal (e.g. steel or aluminum) or combinations thereof, for instance and without limitation. As illustrated in FIG. 3, the container housing 102 may have an interior space 142. A housing top cover 112 may be provided on the container housing 102. The housing top cover 112 may be deployable between an open position (FIGS. 3 and 4) and a closed position (FIGS. 1, 2, 5 and 6) on the container housing 102. As illustrated in FIG. 3, a cover actuating mechanism 150 may be provided in the interior space 142 and preferably carried at least partially by the housing top cover 112, and more preferably by the top cover portion 114 of the housing top cover 112. The cover actuating mechanism 150 may operably engage the housing top cover 112 to open and close the housing top cover 112 as will be described in greater detail hereinafter. By having the cover actuating mechanism 150 at least partially carried by the housing top cover 112, the cover actuating mechanism 150 is moved away from the interior space 142 when the housing top cover 112 is pivoted to the open position, facilitating the disposal of waste items into the interior space 142 and/or maintenance of the sanitary product disposal container 100.

As illustrated in FIG. 1, at least one sensor 162 may be provided in the container housing 102; for example, in some embodiments such as the present embodiment, at least one sensor 162 may be provided in the housing top cover 112. The sensor 162 operably interfaces with the cover actuating mechanism 150 to facilitate movement of the housing top cover 112 responsively to sensing the presence of a person (not illustrated) in close proximity to the container housing 102, as will be described in greater detail hereinafter. In some embodiments, the sensor or sensors 162 may include a heat sensor, a motion sensor, a capacitive sensor or other proximity sensor configured to detect the proximity of a person's hand or other body part, for instance and without limitation.

Figure 5:
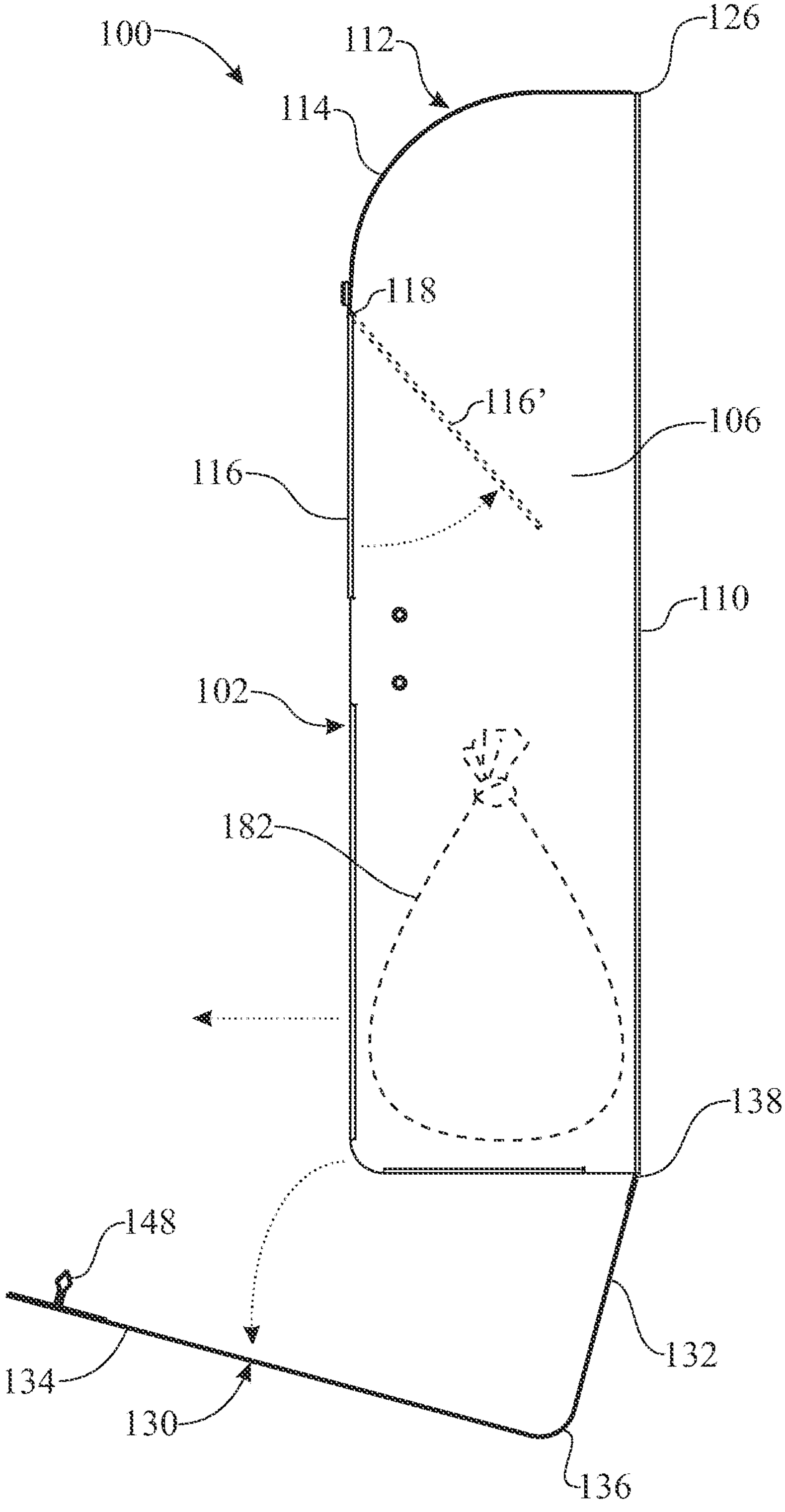
FIG. 5 presents a right side elevation view of the sanitary product disposal container of FIG. 1, with the housing top cover in the closed position (solid lines) and partially-open position (phantom lines) and the housing bottom cover in the open position.

In an illustrative application of the sanitary product disposal container 100, which will be hereinafter described, a used feminine hygiene product may be placed and optionally sealed in a waste bag 182 (FIG. 5). The waste bag 182 may be placed in the interior space 142 of the container housing 102 when the housing top cover 112 is deployed in the open position. The waste bag 182 may be enclosed in the container housing 102 upon subsequent deployment of the housing top cover 112 to the closed position to prevent the spread of bacteria and/or emanation of odors from the interior space 142 of the container housing 102.

As best shown in FIGS. 3 and 5, a housing bottom cover 130 may be provided on the container housing 102. The housing bottom cover 130 may be selectively deployable between a closed position (FIGS. 1-4 and 6) and an open position (FIG. 5) on the container housing 102. The housing bottom cover 130 may be selectively opened to facilitate removal of the waste bag 182 which contains the used feminine hygiene product from the interior space 142 of the container housing 102, and closed to prevent access to the interior space 142 or items falling out of the interior space 142. In some embodiments, such as the present embodiment, the housing bottom cover 130 may be manually deployable between the closed and open positions. In alternative embodiments, the housing bottom cover 130 may be automated to switch between the closed and open positions. In some embodiments, such as that shown herein, the housing bottom cover 130 pivots vertically upward and downward (i.e. about a horizontal pivot axis) such that gravity assists the housing bottom cover 130 in remaining in the open position, to free the maintenance person's hands for removing the waste bag 182, cleaning the sanitary product disposal container 100, or carrying out other applicable actions on the sanitary product disposal container 100.

The container housing 102 may have any size and shape which is consistent with the functional requirements of the sanitary product disposal container 100. In some embodiments, the container housing 102 may include a pair of elongated, parallel, spaced-apart housing side panels 106. A housing rear panel 110 may extend between the housing side panels 106. As illustrated in FIG. 2, in some embodiments, at least one housing mount slot 122 may be provided in the housing rear panel 110 configured to allow extending a fastener (e.g., a screw) therethrough in order to mount the container housing 102 on a wall or other support structure (not illustrated) in a restroom facility or other area.

As illustrated in FIG. 3, in some embodiments, the container housing 102 may include a housing frame 124 which supports or reinforces the housing side panels 106 with respect to the housing rear panel 110. The housing frame 124 may include one or more housing reinforcing members 144 and/or reinforcing gussets 146, for instance and without limitation.

Figure 4:
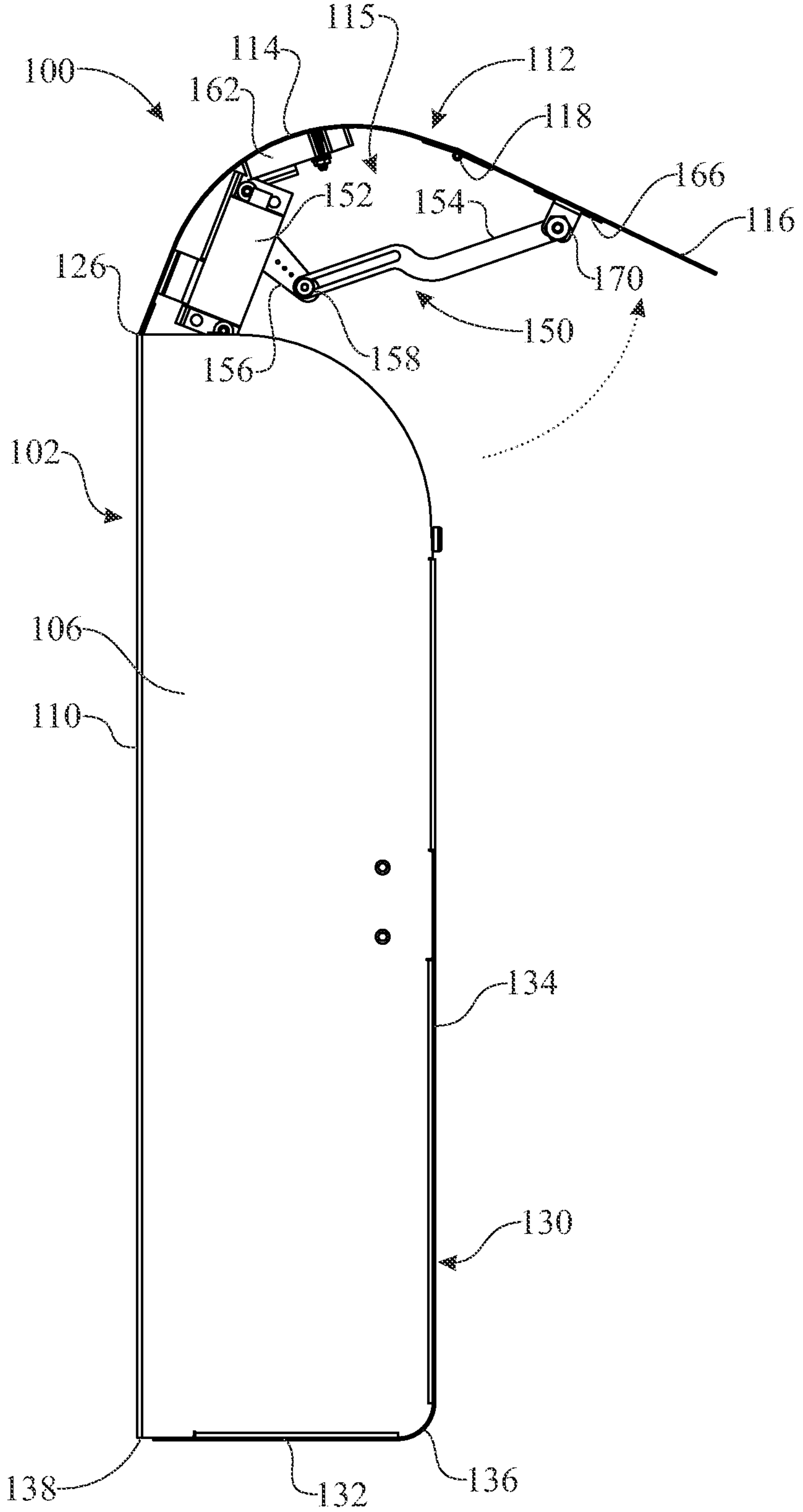
FIG. 4 presents a left side elevation view of the sanitary product disposal container of FIG. 3.

The housing top cover 112 and the housing bottom cover 130 may extend between the housing side panels 106. Preferably, the housing top cover 112 is non-planar, defining an internal space 115 oriented towards the interior space 142 of the container housing 102, wherein the internal space 115 is used to house internal mechanisms of the sanitary product disposal container 100, as will be described in greater detail hereinafter. In some embodiments, the housing top cover 112 may include a convex or outwardly-curved top cover portion 114 and a flat front cover portion 116 extending from the top cover portion 114, the top cover portion 114 and flat front cover portion 116 forming a C-shaped or rounded V-shaped arrangement, as best shown in FIGS. 3 and 4. By being convex or outwardly-curved, the top cover portion 114 provides the aforementioned internal space 115. The upper and front side edges of the respective housing side panels 106 may be curved to match the curved shape of the top cover portion 114 such that the top cover portions 114 rests against or adjacent to the housing side panels 106, with minimal or no space therebetween, when the housing top cover 112 is arranged in the closed position (FIGS. 1 and 2). The top cover portion 114 of the housing top cover 112 may be pivotally attached to the housing rear panel 110 such as via at least one top panel hinge 126. As mentioned heretofore, the cover actuating mechanism 150 may operably engage the housing top cover 112 to actuate the housing top cover 112 to pivot relative to the container housing 102. As illustrated in FIG. 3, in some embodiments, the cover actuating mechanism 150 may operably engage the front cover portion 116 of the housing top cover 112, for purposes that will be hereinafter described.

In some embodiments, such as the present embodiment, the top cover portion 114 and the front cover portion 116 of the housing top cover 112 may deploy between the fully-closed position (FIGS. 1, 2, 5 and 6) and fully-open position (FIGS. 3 and 4) on the container housing 102 together as a single unit with no relative movement between the top cover portion 114 and the front cover portion 116. In addition, in some embodiments, the front cover portion 116 may be pivotally attached to the top cover portion 114 such as via at least one top cover hinge 118, to allow the housing top cover 112 to further adopt a partially-open position in which the top cover portion 114 is closed (similarly to FIG. 1) and the flat front cover portion 116 has been pivoted frontward or rearward about the top cover hinge 118 and relative to the closed top cover portion 114 and container housing 102.

For example, the top cover portion 114 of the sanitary product disposal container 100 depicted herein is configured to movably adopt all three positions mentioned heretofore. In other words, the top cover portion 114 shown herein can pivotably adopt: a fully-closed, rest position (FIGS. 1, 2, 5 and 6), in which both the top cover portion 114 and the flat front cover portion 116 are closed onto the container housing 102; a fully-open, maintenance position (FIGS. 3 and 4), in which the top cover portion 114 and the flat front cover portion 116 have been jointly pivoted outward relative to the container housing 102 for the purpose of repairing, maintaining or replacing the cover actuating mechanism 150; and a partially-open, disposal position (FIG. 5) in which the top cover portion 114 is closed and the flat front cover portion 116 has been pivoted rearward about the top cover hinge 118 to adopt a rearward position (shown in phantom lines and indicated by reference numeral 116') in which the flat front cover portion 116' extends into the container housing 102 leaving a front opening for inserting the waste bag 182 or other waste item into the interior space 142 of the container housing 102 and, further in which, the flat front cover portion 116' conceals and protects the cover actuating mechanism 150 from becoming soiled or damaged by the waste bag 182 or waste item.

In some embodiments, switching from the fully-closed, rest position of FIG. 1 to the fully-open, maintenance position of FIG. 3, or switching from the partially-open, disposal position to the fully-open, maintenance position, may be done manually; i.e., a user may manually pivot the top cover portion 114 about the top panel hinge 126 in order to open or close the top cover portion 114. Alternatively, pivoting of the top cover portion 114 about the top panel hinge 126 may be caused by the cover actuating mechanism 150 responsively to the sensor 162 detecting a person's near presence. In turn, switching from the fully-closed, rest position of FIG. 1 to the partially-open, maintenance position in order to dispose of a waste item is caused by the cover actuating mechanism 150 responsively to the sensor 162 detecting a person's near presence. In the event that both open positions (the fully-open position and the partially-open position) are automatically achievable by operation of the sensor 162 and cover actuating mechanism 150, the sensor 162 and cover actuating mechanism 150 may be configured to sense alternative types of conditions in order to partially or completely operate the cover actuating mechanism 150 to reach the partially-open or fully-open positions, respectively. For example, a user may need to place their hand near the sensor 162 during a relatively high, predetermined amount of time, or place and remove their hand following a predefined pattern, in order to open the housing top cover 112 to the fully-open position (FIGS. 3 and 4) for maintenance, while any other sensing will only cause the cover actuating mechanism 150 to open the housing top cover 112 to the partially-open position, for the disposal of waste items into the container housing 102.

As best shown in FIGS. 3 and 5, in some embodiments, such as the present embodiment, the housing bottom cover 130 may include a bottom cover portion 132 for easy access to the interior space 142 of the container housing 102 for maintenance tasks such as placing a new waste bag in the interior space 142 or removing full waste bags or other waste items hygienically from the container housing 102. The bottom cover portion 132 may be pivotally attached to the lower edge of the housing rear panel 110 such as via at least one bottom cover hinge 138. A front cover portion 134 may extend from the bottom cover portion 132. A cover junction 136 may join the front cover portion 134 to the bottom cover portion 132. In some embodiments, the front cover portion 134 may be perpendicular to the bottom cover portion 132. Accordingly, in the closed position of the housing bottom cover 130, as illustrated in FIGS. 1-4 and 6, the bottom cover portion 132 may be flush with the bottom edges of the respective housing side panels 106 and the front cover portion 134 may be flush with the front edges of the respective housing side panels 106. The upper edge of the front cover portion 134 may abut or extend parallel and adjacent to the lower edge of the front cover portion 116 of the housing top cover 112. In the open position of the housing bottom cover 130, as illustrated in FIG. 5, the bottom cover portion 132 and the front cover portion 134 may pivot away from the container housing 102 to facilitate access to the interior space 142.

Figure 6:
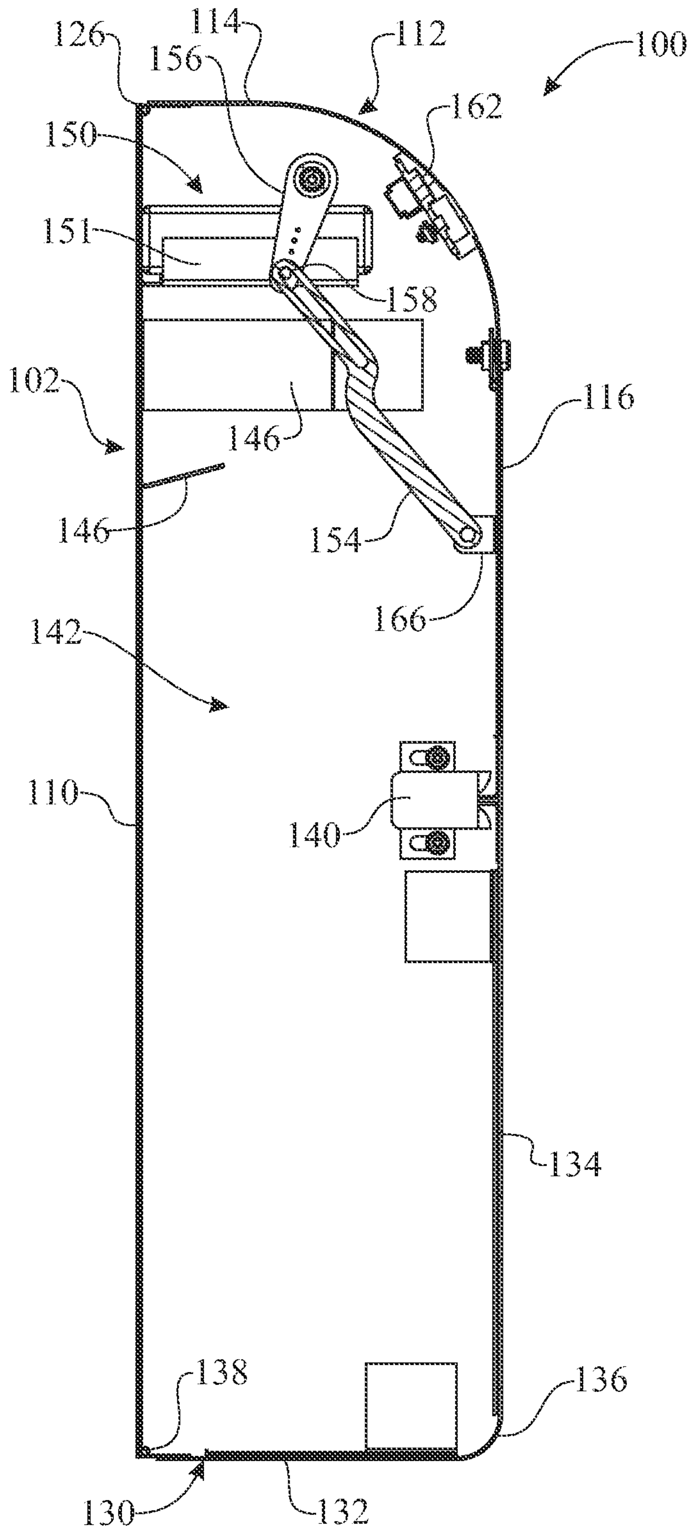
FIG. 6 presents a cross-sectional, left side elevation view of the sanitary product disposal container of FIG. 1 with the housing top cover and the housing bottom cover in the closed position.

As illustrated in FIG. 6, in some embodiments, at least one bottom cover latch 140 may be provided in the interior space 142 of the container housing 102. The bottom cover latch 140 may be configured to operably engage the front cover portion 134 of the housing bottom cover 130 to normally secure the housing bottom cover 130 in the closed position. In some embodiments, the bottom cover latch 140 may be configured to releasably engage at least one latch pin 148 (FIG. 5) which can extend from the interior surface of the front cover portion 134 of the housing bottom cover 130, the at least one bottom cover latch 140 and corresponding latch pin 148 forming a bottom cover fastener; alternatively or additionally, one or more bottom cover fasteners such as magnets, snap buttons, bolts, screws, etc. may be provided to secure the housing bottom cover 130 in the closed position. In some embodiments, the bottom cover latch 140 or other bottom cover fastener may include at least one lock (not illustrated) which engages and locks the housing bottom cover 130 in the closed position. The lock may be actuated by an authorized user such as via a key or combination code, for instance and without limitation, to facilitate deployment of the housing bottom cover 130 from the closed position to the open position according to the knowledge of those skilled in the art. Alternatively or additionally, the bottom cover fastener may include one or more safety or privacy screws.

As illustrated in FIG. 3, the cover actuating mechanism 150 may have any design which is suitable for the purpose of deploying all or part of the housing top cover 112 (for example, the flat front cover portion 116) as described heretofore. In some embodiments, the cover actuating mechanism 150 may include at least one actuating motor 152. The actuating motor 152 may be mounted on the interior surface of the top cover portion 114 of the housing top cover 112 such as via at least one motor mount fastener 176 and motor mount nut 178. The actuating motor 152 may operably engage at least one actuating arm 154 such as via at least one rear arm mount bracket 156 and at least one rear arm mount fastener 158 and rear arm mount nut 160. The distal or extending end of the actuating arm 154 may be attached to the interior surface of the front cover portion 116 of the housing top cover 112 via at least one front arm mount bracket 166, front arm mount fastener 168, front arm mount nut 170 and washers 172. Alternative methods and techniques known by those skilled in the art may be used to mount the actuating motor 152 to the housing top cover 112 and actuating arm 154 to the actuating motor 152 and the housing top cover 112.

In typical application of the sanitary product disposal container 100, the container housing 102 may be mounted on a wall or other supporting structure (not illustrated) typically in a women's restroom facility. In some applications, the container housing 102 may be mounted on the wall or structure by inserting fasteners (not illustrated) which extend from the wall or structure into the respective housing mount slots 122 (FIG. 2) in the housing rear panel 110 of the container housing 102. Alternative techniques known by those skilled in the art may be used to mount the container housing 102 on the wall or structure.

Operation or use of the sanitary product disposal container 100 will now be described. A user (not illustrated) may optionally place a used tampon, sanitary napkin or other feminine sanitary product (not illustrated) in a waste bag 182 (FIG. 5) or other packaging and close the waste bag 182 or packaging, if desired or needed. The user may then stand in proximity to the container housing 102 or wave or bring her hand into proximity with the container housing 102. As the user stands or waves her hand in proximity to the container housing 102, the sensor 162 (FIG. 1) comprised in the container housing 102 may sense the user's presence, such as by sensing heat or movement from the user. Triggered by activation of the sensor 162, the cover actuating mechanism 150 may then deploy the housing top cover 112 from the closed position to the partially-open position by pulling the flat front cover portion 116 of the housing top cover 112 inward, thereby forming a front opening in the container housing 102, while the top cover portion 114 remains closed. The user may then place the waste bag 182 or other waste into the interior space 142 of the container housing 102, after which the cover actuating mechanism 150 may deploy the housing top cover 112 from the partially-open position back to the closed position. The closed container housing 102 may thus enclose the waste bag 182 or other waste and prevent bacteria from spreading to the surrounding area and/or objectionable odors from emanating from the interior space 142 of the container housing 102. Additional users may in like manner dispose of used feminine sanitary products in like manner.

By having the cover actuating mechanism 150 carried generally by the housing top cover 112, the volume of the interior space 142 usable for disposing waste items can be maximized. Furthermore, as best shown in FIG. 4, the C-shaped or rounded V-shaped configuration of the housing top cover 112, by which the cover actuating mechanism 150 is lodged within an internal space 115 of the convex or outwardly-curved top cover portion 114, enables the cover actuating mechanism 150 to remain concealed from the user's sight when the housing top cover 112 swings outward and upward to the open position.

As illustrated in FIG. 5, the waste bags 182 containing the used feminine sanitary products, or other waste items housed within the interior space 142 of the container housing 102, may be removed from the interior space 142 of the container housing 102 typically by disengaging the bottom cover latch 140 (FIG. 6) and opening the housing bottom cover 130. This may enable the waste bags 182 or other waste items to be removed from the interior space 142 into a suitable waste container (not illustrated). After the waste bags 182 or other waste items are removed from the interior space 142, the housing bottom cover 130 may be returned to the closed position and the bottom cover latch 140 reengaged. The waste bags 182 or other waste items may then be disposed of typically in the usual manner.

Should the sanitary product disposal container 100 require maintenance, such as, but not limited to, the replacement of an internal battery comprised in the cover actuating mechanism 150, a person may either pull the top cover 114 upward so that the housing top cover 112 moves to the fully-open position (FIGS. 3 and 4) or, in other embodiments, adequately activate the sensor 162 (e.g., during a preset period of time or with a predefined sensing/non-sensing pattern) causing the cover actuating mechanism 150 to responsively open the entire housing top cover 112 to the fully-open position.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A container suitable to receive and enclose at least one item, comprising:

a container housing comprising an interior space, the interior space comprising a top area and a bottom area arranged vertically below the top area, the container housing further comprising a rear panel arranged rearward of the interior space, a bottom side arranged below the bottom area of the interior space, and a bottom front side extending upward from the bottom side and arranged frontward of the bottom area of the interior space;

a top cover carried by the container housing, the top cover selectively deployable in a closed position and an open position in which the top cover blocks and allows access to the top area of the interior space, respectively; and a bottom cover carried by the container housing, the bottom cover comprising a bottom cover portion and a front cover portion, the bottom cover portion pivotably attached to the container housing at a bottom of the rear panel, the front cover portion rigidly attached to the bottom cover portion at an angle with the bottom cover portion, the bottom cover selectively and pivotably deployable in a closed position and an open position in which the bottom cover blocks and allows access to the bottom area of the interior space, respectively, wherein, when the bottom cover is arranged in the closed position, the front cover portion and the bottom cover portion extend along and cover the bottom front side and the bottom side of the container housing, respectively; wherein the container is configured to selectively adopt:

an insertion configuration, in which the top cover is arranged in the open position allowing insertion of said at least one item into the top area of the interior space, and the top area and the bottom area of the interior space are in spatial communication enabling a vertical falling of said at least one item from the top area of the interior space to the bottom area of the interior space, and further in which the bottom cover is arranged in the closed position, and a removal configuration, in which the top cover is arranged in the closed position, and further in which the bottom cover is arranged in the open position enabling removal of said at least one item from the bottom area of the interior space.

2. The container of claim 1, wherein said spatial communication between the top area and the bottom area of the interior space is further present in the removal configuration.

3. The container of claim 1, wherein the container housing is further configured to adopt a storage configuration, in which the top cover and the bottom cover are arranged in the respective, closed positions, and the container housing and the top and bottom covers enclose the interior space.

4. The container of claim 3, wherein said spatial communication between the top area and the bottom area of the interior space is further present in the storage configuration.

5. The container of claim 1, wherein the top area and the bottom area of the interior space are permanently arranged in said spatial communication.

6. The container of claim 1, wherein:

in the insertion configuration of the container, said at least one item is retained within the bottom area of the interior space by the bottom cover portion extending along and covering the bottom side of the container housing; and when the bottom cover is arranged in the open position, the bottom cover is moved away from the bottom side of the container housing, exposing the bottom area of the interior space, said open position of the bottom cover enabling said at least one item to fall out of the bottom area of the interior space by gravity in the removal configuration of the container.

7. The container of claim 6, wherein the container housing further comprises a top side arranged above the top area of interior space, and a top front side extending downward from the top side and arranged frontward of the top area of the interior space, wherein the bottom front side extends downward from the top front side, and further wherein:

when the bottom cover is arranged in the open position, the bottom cover is moved away from the bottom side and the bottom front side of the container housing and exposes the bottom area of the interior space through the bottom side and the bottom front side of the container housing.

8. The container of claim 1, wherein deployment of the top cover between the open and closed positions of the top cover does not interfere with deployment of the bottom cover between the open and closed positions of the bottom cover, and vice versa.

9. The container of claim 1, wherein the top and bottom covers are independently deployable with respect to one another.

10. The container of claim 1, wherein the top cover is pivotably attached to the container housing and pivotable between the open and closed positions of the top cover.

11. The container of claim 10, wherein the top and bottom covers are pivotable with respect to the container housing about respective parallel rotation axes.

12. The container of claim 10, wherein the top cover is pivotably attached to the container housing at a top of the rear panel of the container housing.

13. The container of claim 1, wherein the bottom cover is pivotable downward by gravity from the closed position to the open position of the bottom cover.

14. The container of claim 1, wherein, in the removal configuration of the container, the front cover portion of the bottom cover is arranged below and in spatial communication with the lower area of the interior space and provides a landing surface for said at least one item falling out of the lower area of the interior space.

15. The container of claim 1, wherein the bottom cover portion and front cover portion of the bottom cover are generally perpendicular to one another, and further wherein:

when the bottom cover is arranged in the closed position, the bottom cover portion of the bottom cover is arranged generally perpendicularly to the rear panel of the container housing.

16. A container suitable to receive and enclose at least one item, comprising:

a container housing comprising:

an interior space, comprising a top area and a bottom area arranged vertically below the top area, a top side and a bottom side arranged above the top area of the interior space and below the bottom area of the interior space, respectively, a top front side extending downward from the top side and arranged frontward of the top area of the interior space, and a bottom front side extending downward from the top front side and upward from the bottom side and arranged frontward of the bottom area of the interior space;

a top cover carried by the container housing, the top cover selectively deployable in a closed position and an open position in which the top cover blocks and allows access to the top area of the interior space, respectively; and a bottom cover carried by the container housing, the bottom cover selectively deployable in a closed position and an open position in which the bottom cover blocks and allows access to the bottom area of the interior space, respectively, wherein, when the bottom cover is arranged in the closed position, the bottom cover extends along and covers the bottom side and the bottom front side of the container housing, and further wherein, when the bottom cover is arranged in the open position, the bottom cover is moved away from the bottom side and the bottom front side of the container housing and exposes the bottom area of the interior space through the bottom side and the bottom front side of the container housing; wherein the container is configured to selectively adopt:

an insertion configuration, in which the top cover is arranged in the open position allowing insertion of said at least one item into the top area of the interior space, and the top area and the bottom area of the interior space are in spatial communication enabling a vertical falling of said at least one item from the top area of the interior space to the bottom area of the interior space, and further in which the bottom cover is arranged in the closed position enabling said at least one item to be retained within the bottom area of the interior space in the insertion configuration of the container, and a removal configuration, in which the top cover is arranged in the closed position, and further in which the bottom cover is arranged in the open position enabling said at least one item to fall out of the bottom area of the interior space by gravity.

* * * * *